UNITED STATES PATENT OFFICE.

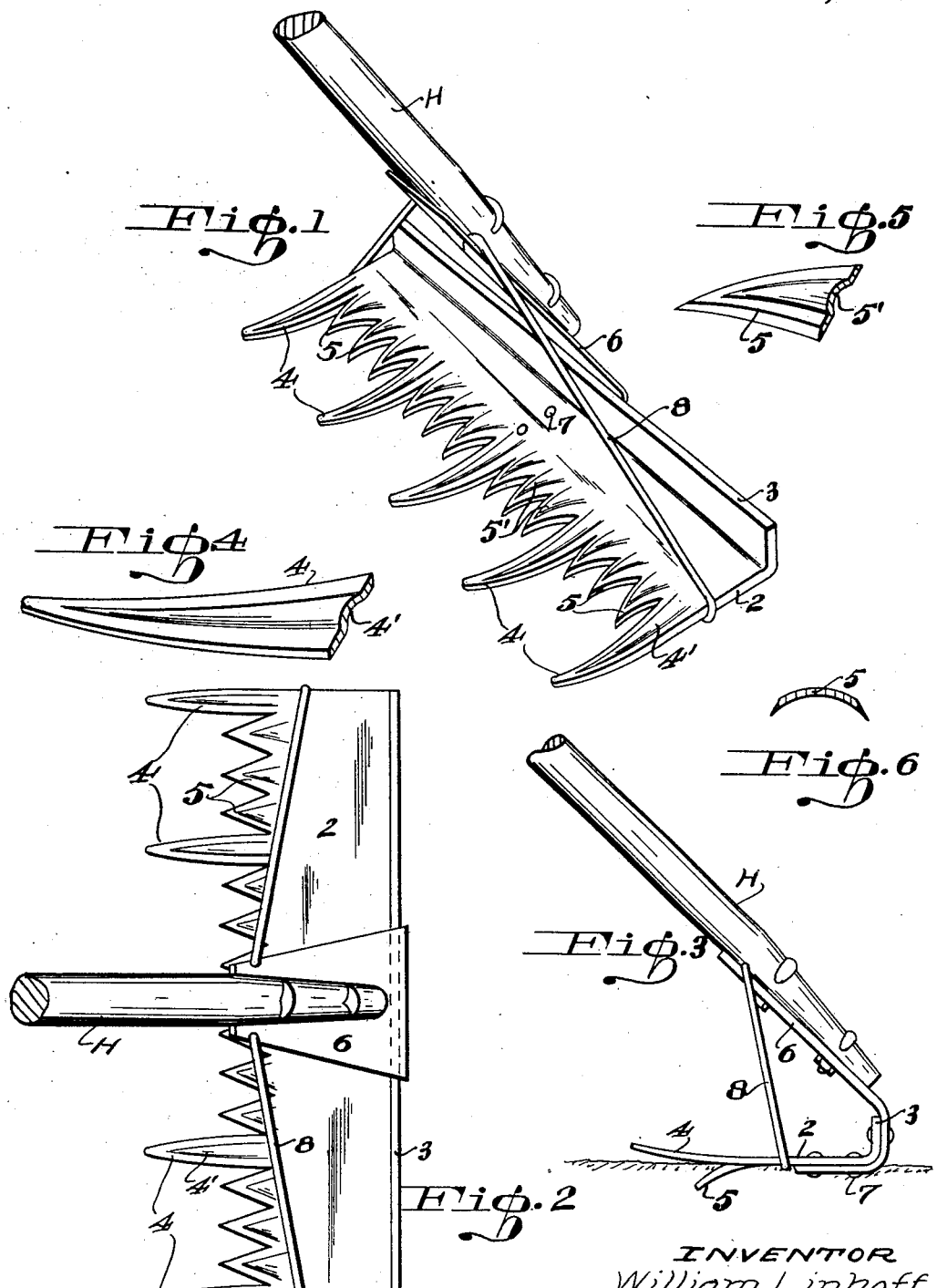

WILLIAM LINHOFF, OF PASADENA, CALIFORNIA.

LAWN-WEEDER.

1,381,569.  Specification of Letters Patent.  Patented June 14, 1921.

Application filed March 16, 1920. Serial No. 366,354.

*To all whom it may concern:*

Be it known that I, WILLIAM LINHOFF, a citizen of the United States, residing at Pasadena, in the county of Los Angeles and State of California, have invented new and useful Improvements in Lawn-Weeders, of which the following is a specification.

This invention relates to agricultural implements, and especially to lawn weeders, and has for its object to provide a tool of this kind that will operate conveniently to cut out weeds and to sever entangled or matted growth, and at the same time is limited with respect to the depth of its cut, and an object of the invention is to provide a device of the kind that is simple, substantial, practicable, and is easily operable in its application and use, and the invention consists of the construction, the combination, and in details and arrangements of the parts, an embodiment of which invention is illustrated in the accompanying drawings and described and claimed hereinafter.

Figure 1 is a perspective of the improved tool showing the upper portion of the handle broken away.

Fig. 2 is a plan view of the tool in the applied position.

Fig. 3 is a side elevation of the tool in its normal working position.

Fig. 4 is a perspective of a portion on one of the guide teeth showing means for reinforcing the same.

Fig. 5 is a perspective of a portion of one of the cutter teeth of one form, and Fig. 6 is a cross section of one of the cutter teeth of another form.

The improved tool consists of a hoe-like blade that is preferably made of stamped sheet metal of desired rigidity and comprises a longitudinally extending body portion 2 having at its front longitudinal edge an up-turned flange 3, and the rear edge of the blade or sheet 2 is provided with a series of spaced guide-forming toes or prongs 4—4, any suitable number of which may be utilized and one of which is shown at each end of the blade 2.

Intermediately between each of the guide toes 4 is arranged a group of cutter teeth 5—5. As shown clearly in Fig. 3 the guide teeth 4 are bent slightly upwardly and rearwardly from the plane of the blade 2 while the cutter teeth 5 are bent downwardly from the plane of the blade 2, so that while the device may be rocked on the lower surface of the teeth 4 the teeth 5 can only enter to a predetermined depth.

To manipulate the device a handle H is shown as connected to an upwardly extending bracket or shank 6 inclined upwardly and rearwardly over the flange 3, and the bracket 6 may be formed of a separate piece riveted or otherwise attached as at 7 to the central portion of the blade 2. Diagonal braces 8 may be extended from the upper end of the bracket or shank 6 outwardly and secured to the outer ends of the blade 2. Preferably, the guide toes 4 are reinforced as by longitudinal corrugations or ribs 4' and the teeth 5 may be similarly reinforced by a ribbed bead 5', Fig. 5. A different method of reinforcing a tooth 5 is shown in Fig. 6, wherein the tooth is given a concavo-convex form.

From the above it will be seen that I have provided an extremely simple and convenient device for rapidly cutting weed growth from lawns and have provided means for limiting the depth of the cutting teeth into the growth and soil.

Various changes may be made without departing from the spirit of the invention as claimed.

What is claimed is:

1. In a lawn weeder, a body formed of sheet metal bent so that it is substantially L-shaped in cross section and with its horizontal leg substantially wider than its vertical leg, a series of integrally formed pointed prongs projecting outwardly from the outer edge of the horizontal leg of said L-shaped body, said prongs being spaced apart, and a plurality of relatively short pointed cutting members projecting outwardly from the horizontally disposed leg of said L-shaped body, between said prongs.

2. In a lawn weeder, a body formed of sheet metal bent so that it is substantially L-shaped in cross section and with its horizontal leg substantially wider than its vertical leg, a series of integrally formed pointed prongs projecting outwardly from the outer edge of the horizontal leg of said L-shaped body, said prongs being spaced apart and being gradually curved upward toward their outer ends, and a plurality of relatively short pointed cutting members projecting outwardly from the horizontally disposed leg of said L-shaped body, between said prongs.

3. In a lawn weeder, a body formed of sheet metal bent so that it is substantially L-shaped in cross section and with its horizontal leg substantially wider than its vertical leg, a series of integrally formed pointed prongs projecting outwardly from the outer edge of the horizontal leg of said L-shaped body, said prongs being spaced apart, a plurality of relatively short pointed cutting members projecting outwardly from the horizontally disposed leg of said L-shaped body, between said prongs, and said pointed cutting members being curved gradually downward toward their outer ends.

4. In a lawn weeder, a body formed of sheet metal bent so that it is substantially L-shaped in cross section and with its horizontal leg substantially wider than its vertical leg, a series of integrally formed pointed prongs projecting outwardly from the outer edge of the horizontal leg of said L-shaped body, said prongs being spaced apart, and a plurality of relatively short, downwardly curved pointed members projecting outwardly from the edge of the relatively wide leg of the L-shaped body between the prongs thereon, the side edges of which pointed members are beveled to form cutting edges.

In testimony whereof I have signed my name to this specification.

WILLIAM LINHOFF.